H. SCHUBERT.
SCALE.
APPLICATION FILED JAN. 30, 1920.

1,364,146.

Patented Jan. 4, 1921.
2 SHEETS—SHEET 1.

Inventor
H. Schubert
By
Attorney

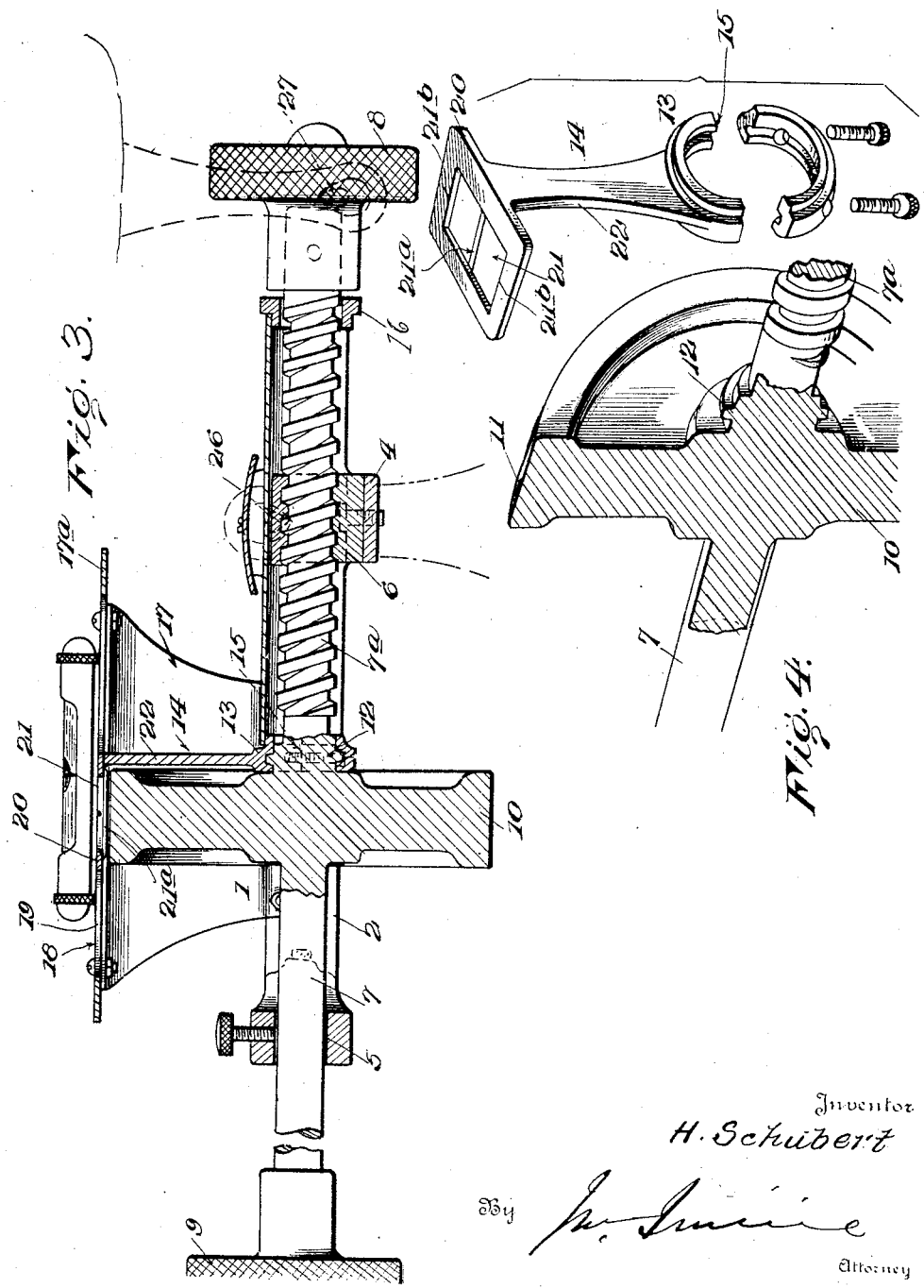

UNITED STATES PATENT OFFICE.

HERMAN SCHUBERT, OF TROY, NEW YORK, ASSIGNOR TO JAMES A. WHELAN, OF TROY, NEW YORK.

SCALE.

1,364,146.    Specification of Letters Patent.    Patented Jan. 4, 1921.

Application filed January 30, 1920. Serial No. 355,099.

*To all whom it may concern:*

Be it known that I, HERMAN SCHUBERT, a citizen of the United States, residing at No. 446 Eighth avenue, N., in the city of Troy, in the county of Rensselaer and State of New York, have invented certain new and useful Improvements in Scales, of which the following is a specification.

This invention relates to improvements in scales.

The primary object of the invention is to improve the construction and arrangement of the indicating mechanism disclosed in the patent to Whelan No. 734,383 dated July 21, 1903.

According to my invention I provide a substantially horizontal guideway above the weight, and an indicator to move with the latter having a portion slidably mounted in the guideway and formed with a sight opening and an indicator to coöperate with graduations on said weight in ascertaining the sum total of a weighing operation.

The purpose and object of this construction is to insure accuracy and convenience in operation.

A further object of the invention is to so arrange the parts as will insure of the ounce and pound graduations being readily discernible when using the scale.

The invention also comprehends improvements in the details and construction and arrangement of parts which will be hereinafter described and particularly pointed out in the claims.

In the drawings:—

Fig. 3 is a longitudinal vertical section of the same.

Fig. 4 is a broken perspective showing the rotary and sliding scale members in separated relation to illustrate their means of connection.

Figure 1:
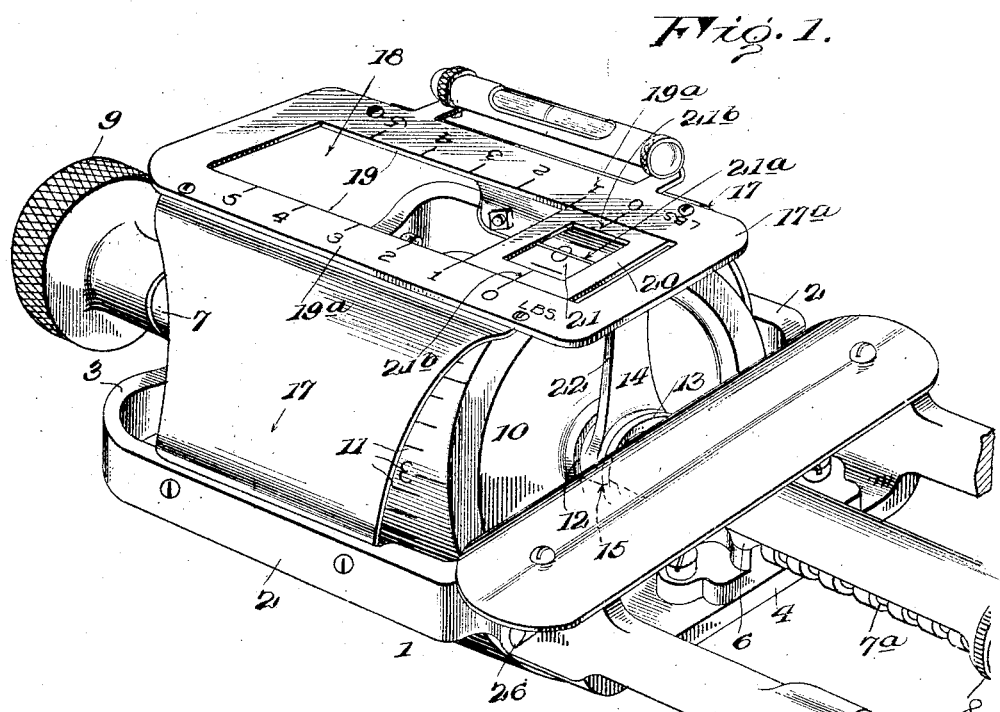
Figure 1 is a perspective view of a portion of the scale to illustrate the improvement.
Figure 2:
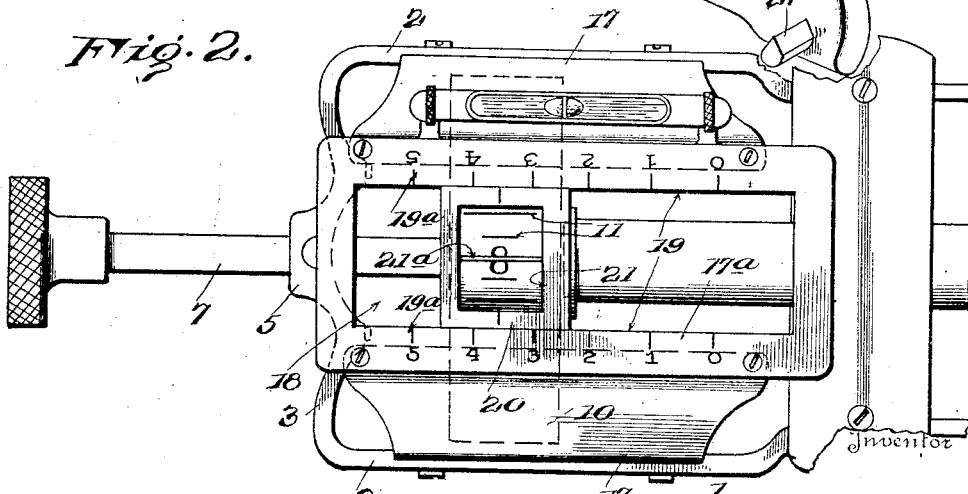
Fig. 2 is a plan of the same.

1 indicates a weight carrying frame scale or beam, comprising a pair of side arms 2, an end cross bar 3, and an intermediate cross bar 4.

The end cross bar 3 is formed with a smooth bearing 5, and bolted or otherwise fastened to the intermediate cross bar 4, is a threaded bearing 6. Extending through the bearings 5 and 6, is a shaft 7, threaded for a portion of its length as at 7ª to engage the threaded bearing 6. At one end of the shaft is a counterpoise 8 and at its opposite end a finger engaging knob 9.

Fixed on the shaft 7, is a disk weight 10, provided on its periphery with a series of scale graduations 11 to indicate ounces, and fractions thereof. On a hub or collar 12, on the shaft directly adjacent one face of the disk weight, is a bearing 13, of a frame 14. The bearing is formed of two members, bolted together at 15, to engage over and inclose the collar 12 to cause the frame to move longitudinally with the shaft when the latter is rotated. The frame has an extended portion which lies over and protects the screw threads of the shaft and at its outer end it is provided with a bearing 16, through which the shaft freely extends and freely rotates.

By this arrangement the shaft is permitted to turn, while at the same time the frame moves back and forth with the shaft as it is adjusted in its bearings.

Rising from and bolted to the side arms 2, is a pair of supports 17, and attached to the upper ends of same is a frame 17ª formed with an elongated opening 18, the side walls of which form guideways 19, for an auxiliary frame 20 formed with an opening 21. Along the edges of the side walls 19 are scale graduations 19ª to indicate pounds, as will presently appear. The auxiliary frame 20 extends from and is supported on an arm 22 rising from and forming a part of the frame 14. The opening 21, is disposed over the periphery of the disk weight 10, and extending across said opening is a wire 21ª or other indicating means to assist in reading the graduations 11, and at opposite edges of the auxiliary frame are indicating marks 21ᵇ which coöperate with pound graduations 19ª.

It is not thought necessary to illustrate the improvement as applied to a complete scale, except to disclose the fact that the weight carrying frame is supported by lugs 26, and the usual weighing pan is supported on lugs 27.

In operation, when the weight is in normal balanced position, as shown in Fig. 1, the indicator marks 21ᵇ on the auxiliary frame 20, accurately register with the zero graduations 19ª on the frame 17ª, while the wire 21ᵃ lies directly over and registers with the zero graduation 11 on the periphery of the disk weight 10.

Suppose for instance it be desired to weigh 3 lbs. 8 ounces, the knob 9 is rotated to adjust the shaft 7, consequently the weight 10, to overbalance the counterpoise weight 8, in the usual manner. The operator continues rotation of the shaft until the indicating mark 21ᵃ on the frame 20, passes the graduations indicated by the numeral 3, and then keeps an eye on the wire indicator until the graduation, indicated by the numeral 8, on the periphery of the weight comes directly under it, the auxiliary frame 20 sliding in the guideways while this adjustment is being made.

Of course it will be understood that the parts are so arranged and proportioned as to cause the pounds and ounces graduations to accurately register when weighing any particular weight, the illustration above given being merely an example of the accomplishment of the invention.

In the movement of the parts it is evident that accuracy in location is an absolute essential, and to this end it will be readily appreciated that the construction and arrangement of the frames 14 and 20 and the guideway will effectually maintain the requisite relationship.

The reciprocating frame 14 must travel with the weight, and is prevented from turning by the formation of the auxiliary frame 20 and the guideway, hence the parts are constantly retained in perfect alinement and adjustment.

The invention, aside from maintaining accuracy of movement provides simple means for an operator to readily, conveniently and quickly read at a glance the graduations for a determinate weighing value.

What I claim is:

1. In a weighing scale, the combination with a weight carrying frame, a shaft threaded for longitudinal movement in the frame, a weight secured to said shaft, and provided on its periphery with scale graduations, a guideway supported on the weight carrying frame, and having thereon scale graduations, a frame pivotally mounted on and movable longitudinally with the shaft, said latter frame having an auxiliary frame which slides in the guideway and provided with an opening with an indicator located over and coöperating with the graduations on the weight and the graduations adjacent the guideway to determine the sum total of the article weighed.

2. In a weighing scale, the combination of a weight carrying frame, a screw shaft mounted therein for longitudinal movement and carrying a weight provided on its periphery with scale graduations, a frame fixed to opposite sides of the scale carrying frame and provided at its top with an elongated opening forming a guideway with scale graduations, an auxiliary frame slidably mounted in the guideway and provided with an indicator extending across same to coöperate with the scale graduations on the weight, the frame having an indicator to coöperate with the graduations adjacent the guideway, and means for mounting the auxiliary frame to cause same to move longitudinally with the weight, whereby the scale graduations indicate the sum total of the article weighed.

3. In a weighing scale the combination of a weight carrying frame, an elongated guideway carried thereby and provided with scale graduations, a weight mounted under the guideway and provided on its periphery with scale graduations, means for rotatively and laterally moving the weight under the guideway, and an auxiliary frame slidably mounted in the guideway and movable laterally simultaneously with the lateral movement of the weight and provided with fixed indicators to coöperate with the scale graduations on the guideway and the weight to ascertain a predetermined sum total of the article weighed.

4. In a weighing scale, a weight-carrying frame, a weight peripherally provided with scale graduations, means for simultaneously adjusting the weight longitudinally and rotarily with respect to the frame, a member fixed with relation to the frame and having scale graduations, and means responsive to the movement of the weight longitudinally of the frame and indicatively coöperating with the graduations on the weight and with the graduations on such member.

5. In a weighing scale, a weight-carrying frame, a weight peripherally provided with scale graduations, means for simultaneously adjusting the weight longitudinally and rotarily with respect to the frame, a member fixed with relation to the frame and having scale graduations, and an auxiliary member responsive to movement of the weight longitudinally of the frame and having a part to coöperate indicatively with the graduations on said member and a part to indicatively coöperate with the graduations on the weight.

6. In a weighing scale, a carrying frame, means for adjusting the weighing capacity of the frame and adapted for movements in each of two distinct directions in such adjustment, said scale having independent scale graduations, one fixed with relation to the frame and the other movable with respect thereto, and a member responsive to movement of said means in one direction and indicatively coöperating with both scale graduations in all adjustments of said means.

7. A weighing scale having a frame with relatively fixed scale graduations, a member arranged to coöperate with such graduations, means mounted for rotative and longitudinal movement with respect to the frame to vary the weighing capacity of such frame, said means having scale graduations adjusted under such rotary movement, a connection between said means and said member to adjust the member in and during the longitudinal movement of said means, and an indicator carried by said member to coöperate with the scale graduations on said means.

In testimony whereof I affix my signature.

HERMAN SCHUBERT.